INVENTOR.
D. M. VESPER
BY Hudson & Young
ATTORNEYS

Dec. 25, 1962 D. M. VESPER 3,069,898
ANALYZER AND FLUID SAMPLING SYSTEM
Filed Feb. 20, 1959 3 Sheets-Sheet 2
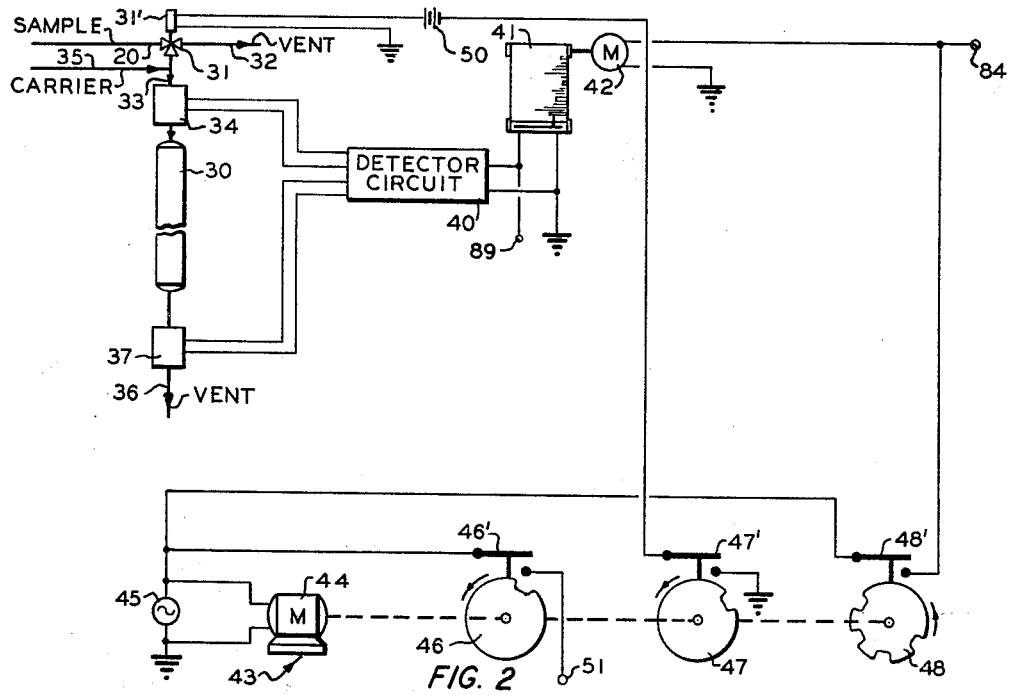
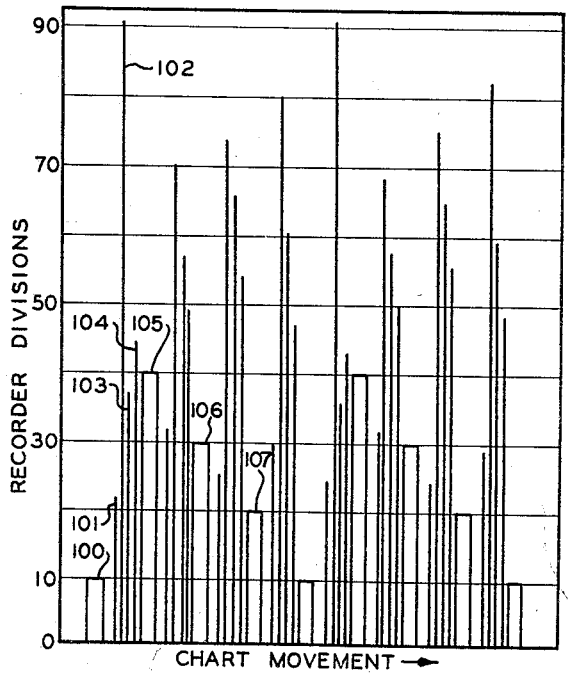
FIG. 4
INVENTOR.
D.M. VESPER
BY *Hudson & Young*
ATTORNEYS INVENTOR.
D. M. VESPER
BY Hudson & Young
ATTORNEYS

United States Patent Office 3,069,898
Patented Dec. 25, 1962

3,069,898
ANALYZER AND FLUID SAMPLING SYSTEM
Daniel M. Vesper, Bartlesville, Okla., assignor to Phillips Petroleum Company, a corporation of Delaware
Filed Feb. 20, 1959, Ser. No. 794,742
7 Claims. (Cl. 73—23)

This invention relates to the analysis of fluid streams. In another aspect it relates to apparatus for obtaining fluid samples from a plurality of process streams in sequence.

In various industrial operations it is desirable to analyze sample streams from a plurality of process streams or containers. Such analyses can often be made by means of a single analyzer which is supplied with samples from the several process streams in sequence. Various types of sampling systems have been developed for this purpose. For the most part, these sampling systems utilize cam operated switches which direct the sample streams to the analyzer in sequence. While these systems operate in a satisfactory manner, the cams must be modified or replaced whenever it is desired to change the sampling cycle. Furthermore, it is difficult to determine readily from the analyzer recorder which of the streams is being directed to the analyzer at any given time.

In accordance with the present invention, there is provided an improved system for obtaining samples from a plurality of process streams or containers in any desired sequence. This system can readily be adjusted by means of manually operated switches so that the sampling sequence can be changed. The sampling system of this invention also incorporates means to provide a signal which is representative of the individual stream being sampled. This signal can be applied to the analyzer recorder so that a mark is made on the chart prior to each analysis which is representative of the particular stream being analyzed.

Accordingly, it is an object of this invention to provide an improved fluid stream analyzer.

A further object is to provide a fluid sampling system which permits samples from a plurality of process streams to be directed to an analyzer in any desired sequence.

A further object is to provide apparatus for indicating on the recorder of a multistream analyzer the particular stream being analyzed.

Other objects, advantages and features of the invention should become apparent from the following detailed description which is taken in conjunction with the accompanying drawings in which:

FIGURE 2 is a schematic representation of a fluid stream analyzer and recorder.

FIGURE 4 is a graphical representation of a typical recorded signal produced by the sampling system and analyzer of this invention.

Figure 1:
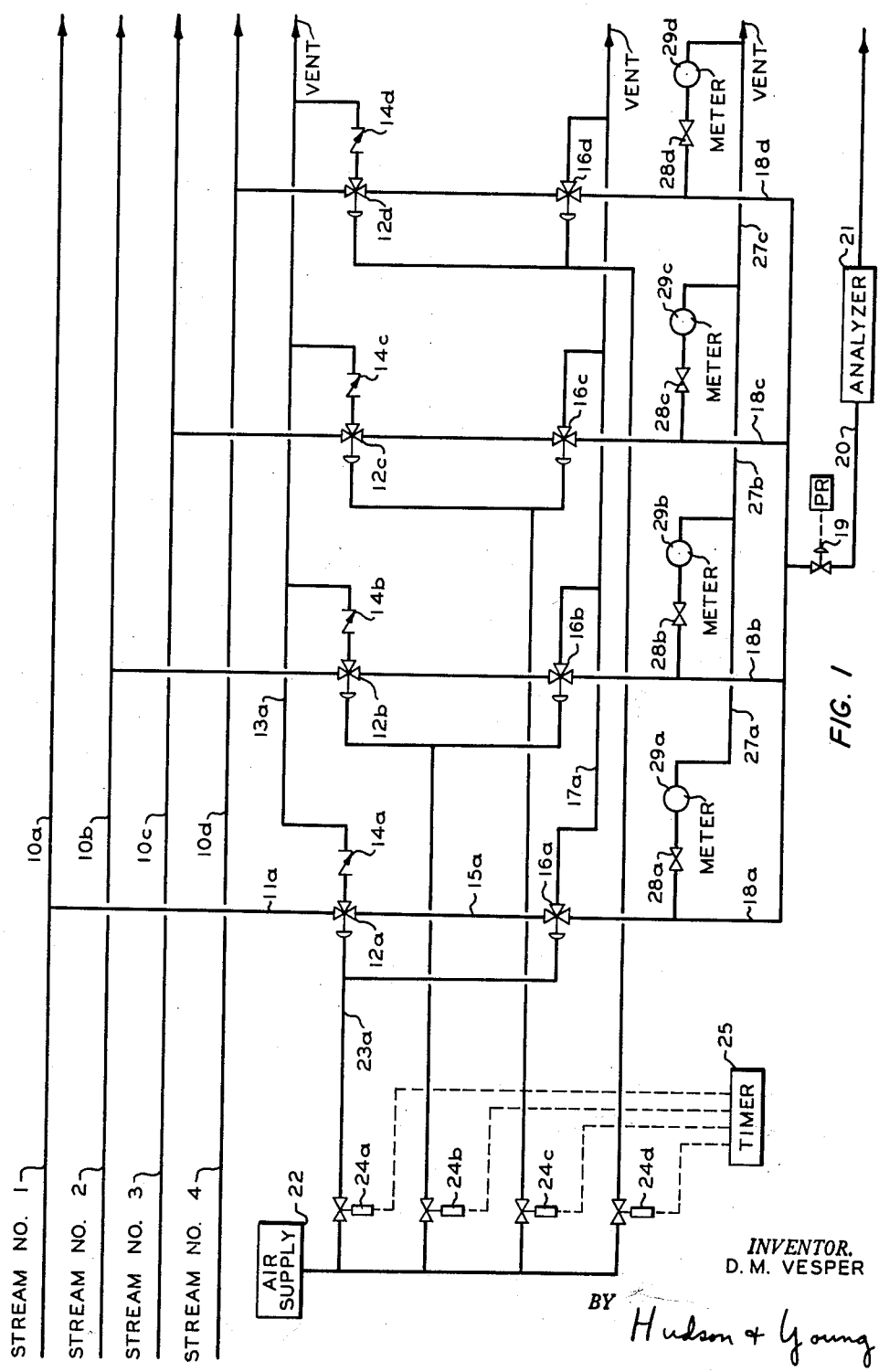
FIGURE 1 is a schematic representation of a conduit system employed to obtain samples from a plurality of process streams.

Referring now to the drawing in detail and to FIGURE 1 in particular, there is shown a plurality of conduits 10a, 10b, 10c and 10d which contain process streams to be analyzed. A conduit 11a communicates between conduit 10a and the inlet port of a pneumatically operated three-way valve 12a. The first outlet port of valve 12a is connected to a vent conduit 13a which has a check valve 14a therein. The second outlet port of valve 12a is connected by a conduit 15a to the inlet port of a second pneumatically operated three-way valve 16a. The first outlet port of valve 16a is connected to a vent conduit 17a. The second outlet port of valve 16a is connected by a conduit 18a to the inlet of a pressure regulator 19. The outlet of pressure regulator 19 is connected by a conduit 20 to the inlet of an analyzer 21.

Valves 12a and 16a are actuated by air under pressure from a source 22. A conduit 23a, which has a solenoid operated valve 24a therein, communicates between air supply 22 and the actuators of valves 12a and 16a. Valve 24a is controlled by a timer 25 which is described in detail hereinafter. In the absence of air being supplied to the actuators of valves 12a and 16a, conduits 11a and 13a are in communication, as are conduits 15a and 17a. The material vented through conduit 13a can be returned to the process. Conduit 17a vents any leakage through valve 12a. When current is supplied to the solenoid of valve 24a, the valve is opened to supply air to the actuators of valves 12a and 16a. This results in valves 12a and 16a being operated so that conduit 11a is in communication with conduit 15a which is in communication with conduit 18a so that a sample from stream No. 1 in conduit 10a is supplied to analyzer 21.

A vent conduit 27a, which has a bleed valve 28a and a flow meter 29a therein, communicates with conduit 18a between valve 16a and pressure regulator 19. This permits a small amount of the sample stream to be bled from the system continuously.

Conduits 10b, 10c and 10d are connected to analyzer 21 by means of respective conduit systems which are identical to the one described above and which are indicated by corresponding b, c and d reference characters. Timer 25 opens valves 24a, 24b, 24c and 24d in the desired sequence so that only one of these valves is open at any given time. This results in one of the sample streams being directed to analyzer 21. The remaining sample streams are vented through conduit 13a. This assures that fresh sample is available at valves 12a, 12b, 12c and 12d whenever these valves are actuated. Conduits 27a, 27b, 27c and 27d serve to vent fluid from respective conduits 18a, 18b, 18c and 18d at all times so that there is substantially no sample trapped in these conduits between subsequent analyses. Meters 29a, 29b, 29c and 29d provide visual indications that sample is being vented through the respective conduits. Since the process streams often are under considerable pressure, regulator 19 is provided so that the sample delivered to the analyzer is at a lower pressure which is suitable for analysis purposes.

In order to describe the operation of the fluid sampling system of this invention, reference will be made to a chromatographic analyzer which receives samples from the four process streams in sequence. A chromatographic analyzer which is suitable for this purpose is illustrated schematically in FIGURE 2. The analyzer comprises a column 30 which is filled with a material that selectively retards the passage therethrough of the individual constituents of a sample stream to be analyzed. Sample conduit 20 of FIGURE 1 communicates with the inlet of a three-way solenoid operated valve 31. The first outlet of valve 31 is connected to a vent conduit 32. The second outlet of valve 31 is connected to the inlet of column 30 by means of a conduit 33 which has a detecting cell 34 therein. This detecting cell can advantageously comprise a temperature sensitive resistance element which is positioned in thermal contact with the fluid flowing through conduit 33. A conduit 35 communicates with conduit 33 to supply a carrier gas to the analyzer. A vent conduit 36, which has a second detector cell 37 therein, communicates with the outlet of column 30.

In the absence of current being supplied to the solenoid 31' of valve 31, conduits 20 and 32 are in communication so that the sample is vented. The carrier gas flows through column 30. At the beginning of an analysis cycle, valve 31 is opened for a given period of time to introduce a predetermined volume of the sample fluid into column 30. This is accomplished by supplying current to the solenoid 31' of valve 31. The carrier gas continues to flow through column 30 and drives the individual constituents of the sample through the column. These constituents tend to be sorbed by the material in column 30 to varying degrees so that the effluent from the column contains the individual constituents in sequence. The thermal conductivity of the inlet gas is compared with the thermal conductivity oft he effluent gas to provide an indication of the individual constituents of the sample as they appear in the column effluent.

As previously mentioned, cells 34 and 37 can advantageously comprise temperature sensitive resistance elements. These elements are connected in a detector circuit 40 which can comprise a Wheatstone bridge. An output signal is thus provided which represents differences between the thermal conductivities of the bases flowing through cells 34 and 37. The output signal from the detector circuit is applied to a recorder 41 which can advantageously be a strip-chart recorder wherein the recording chart is advanced by a motor 42.

Motor 42 and the actuating solenoid 31' of valve 31 are controlled by a timer 43. This timer comprises a constant speed motor 44 which is energized by a current source 45. The drive shaft of motor 44 carries three cams 46, 47 and 48 which actuate respective switches 46', 47' and 48'. Solenoid 31' is connected in circuit with a current source 50 through switch 47'. Motor 42 is connected in circuit with current source 45 through switch 48'. Cam 47 is provided with a single depression so that switch 47' is closed for a short time interval once during each revolution of cam 47. Closure of switch 47' results in solenoid 31' being energized to introduce a sample of material to column 30. Cam 48 is provided with a plurality of depressions so that switch 48' is closed a plurality of times during each revolution of the cam. Each time switch 48' is closed, motor 42 is energized to advance the chart of the recorder. The depressions in cam 48 are positioned so that the chart is advanced between the times the individual constituents of the gas sample appear in the effluent from column 30. As will be described in greater detail hereinafter, this results in a series of spaced lines appearing on the chart, the lengths of which are representative of the concentrations of the individual constituents of the sample gas in the column effluent. Cam 46 has a single depression which results in switch 46' being closed once during each revolution of the cam. Switch 46' connects current source 45 to a terminal 51 of a controller which is illustrated in detail in FIGURE 3.

Figure 3:
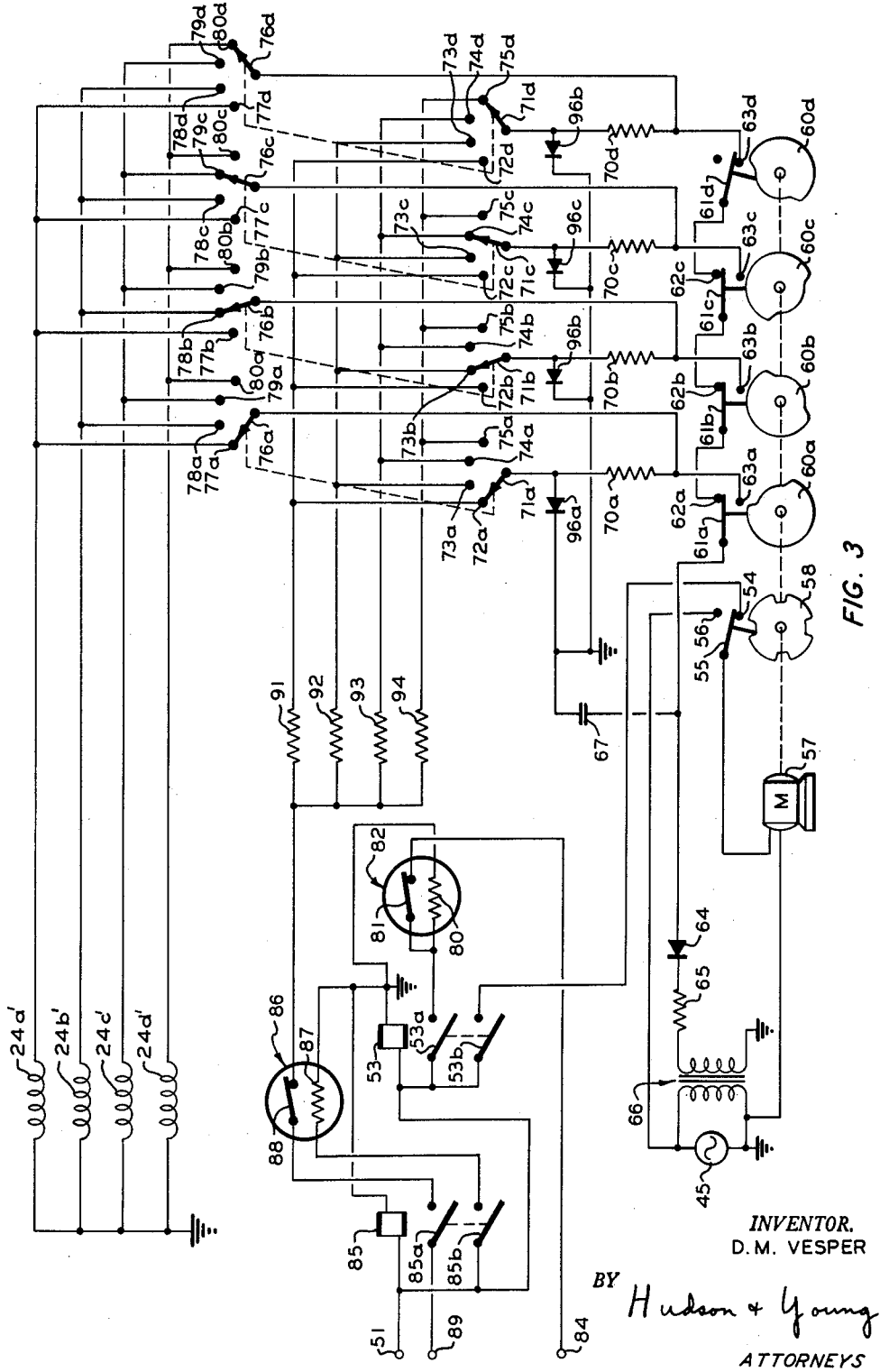
FIGURE 3 is a schematic circuit drawing of an embodiment of the valve actuating and stream marking means of this invention.

Terminal 51 of FIGURE 2 is connected to the first terminal of a relay coil 53 of FIGURE 3. The second terminal of relay coil 53 is connected to ground. Terminal 51 is also connected to switches 53a and 53b which are closed when relay coil 53 is energized. Closure of switch 53b results in terminal 51 being connected to a contact 54 which is adapted to be engaged by a switch 55. The first terminal of current source 45 is connected to a contact 56 which is also adapted to be engaged by switch 55. Switch 55 is connected to the first terminal of a constant speed motor 57, the second terminal of which is connected to the grounded second terminal of current source 45. A cam 58 is carried by the drive shaft of motor 57 and serves to actuate switch 55. Cam 58 is provided with four depressions so that switch 55 engages contact 54 each time the switch engages one of the depressions.

At the beginning of the analysis cycle, cam 46 of FIGURE 2 closes switch 46' so that relay coil 53 of FIGURE 3 is energized. This closes switch 53b so that motor 57 is energized from current source 45 through switch 55. It is assumed that switch 55 is in engagement with contact 54 at this time. Cam 58 then rotates so that switch 55 engages contact 56. Thereafter, cam 46 rotates to a position such that switch 46' is opened. Since relay coil 53 is deenergized at this time, motor 57 continues to be energized by current source 45 through the connection between switch 55 and contact 56. Motor 57 thus continues to rotate until switch 55 drops into the second depression on cam 58. For purposes of description, it will be assumed that cam 58 makes one rotation in 30 minutes so that the initial rotation of motor 57 continues for approximately 7½ minutes. It is also assumed that the cams associated with motor 44 of FIGURE 2 make one revolution in 15 minutes. This 15 minute period is the time required for one complete analysis by the analyzer of FIGURE 2.

The drive shaft of motor 57 also carries a series of cams 60a, 60b, 60c and 60d. Cam 60a, for example, actuates a switch 61a so as to engage either a contact 62a or a contact 63a. Switch 61a is connected through a rectifier 64 and a resistor 65 to the first terminal of the secondary winding of a transformer 66. The second terminal of the secondary winding of transformer 66 is connected to ground. The primary winding of transformer 66 is energized by current source 45. Contact 63a is connected through a resistor 70a to a switch 71a which is adapted to engage terminals 72a, 73a, 74a and 75a selectively. Contact 63a is also connected to a switch 76a which is adapted to engage terminals 77a, 78a, 79a and 80a selectively. Switches 71a and 76a are mechanically connected to one another. Terminals 77a, 78a, 79a and 80a are connected to ground through respective solenoids 24a', 24b', 24c' and 24d' which actuate respective valves 24a, 24b, 24c and 24d of FIGURE 1.

Cam 60a is designed so that switch 61a engages contact 63a approximately twenty seconds after motor 57 is energized. If switch 76a is in engagement with terminal 77a, as illustrated, solenoid 24a' is energized to open valve 24a of FIGURE 1 to direct a sample from conduit 10a to the analyzer.

Cams 60b, 60c, and 60d actuate respective switches 61b, 61c and 61d. These switches correspond generally to switch 61a. The contacts 63b, 63c and 63d are adapted to be connected to respective solenoids 24b', 24c' and 24d' through respective switches 76b', 76c' and 76d' which correspond generally to switch 76a. Contact 62a is connected to switch 61b; contact 62b is connected to switch 61c; and contact 62c is connected to switch 61d. The depressions in cams 60b, 60c and 60d are arranged so that the associated switches are actuated in sequence during one complete rotation of the cams. When switches 76a, 76b, 76c and 76d are in the position illustrated, solenoids 24a', 24b', 24c' and 24d' are energized in sequence.

The contact associated with switch 53a is connected to first terminals of the heating coil 80 and a switch 81 of a time delay switch 82. The second terminal of the heating coil is connected to ground and the contact of switch 81 is conected to a terminal 84 which is connected to motor 42 of FIGURE 2. When relay coil 53 is energized, switch 53a is closed so that current is directed through heating coil 80. The resulting heat opens switch 81, which can be a bimetallic element, after a predetermined time interval. Prior to the time switch 81 is opened, motor 42 of FIGURE 2 is energized through contact 84 to drive the chart of recorder 41. Motor 42 is deenergized when switch 81 is opened.

Terminal 51 is also connected to the first terminal of a relay coil 85, the second terminal of which is connected to ground. A second time delay switch 86 is associated with switches 85a and 85b which are closed when relay coil 85 is energized. The heating element 87 of switch 86 is connected between terminal 51 and ground by switch 85b. When relay coil 85 is energized, switch 85b is closed to supply current to heating element 87. After a predetermined time interval, switch 88, which can be a bimetallic element, is opened. Switch 88 is conected through switch 85a to a terminal 89 which is connected to one of the input terminals of recorder 41 of FIGURE 2. The contact of switch 88 is connected through respective resistors 91, 92, 93 and 94 to respective terminals 72a, 73a, 74a and 75a of switch 71a. Switch 71a is connected to ground through a rectifier 96a.

It should thus be evident that a direct potential exists at switch 71a when switch 61a is in engagement with contact 63a. When switch 71a is in engagement with terminal 72a, as illustrated, this potential is applied through resistor 91, switch 88 and switch 85a to recorder 41. Since relay coils 53 and 85 are operated simultaneously, this potential is applied to the recorder at the same time motor 42 is energized. A bar is thus drawn on the recorder chart, the length of which is proportional to the magnitude of the voltage applied to the recorder. Resistors 91, 92, 93 and 94 have different values so that the voltages applied to the recorder through these different resistors have different values. Thus, the lengths of the bars on the recorder chart are indicative of the particular position of switch 71a which, in turn, is representative of the sample stream being directed to the analyzer.

FIGURE 4 is a graphical representation of a typical record which is provided by recorder 41. At the beginning of the analysis cycle, relay coils 53 and 85 are energized so that motor 42 is energized and a signal is applied to the recorder through one of the resistors 91 to 94. This provides a bar such as 100 on the recorder chart. At a later time in the analysis cycle, cam 48 is rotated so that switch 48' is closed for a short period. This also energizes motor 42 to move the chart away from the recorded bar 100. The first depression in cam 48 is positioned so that this movement takes place prior to the time that the first constituent in the sample fluid appears in the effluent from column 30. The chart remains stationary at the time this first constituent appears so that a line 101 is recorded, the length of which is representative of the amount of the constituent which appears in the column effluent. Thereafter, motor 42 is again energized to advance the chart to the next position so that the second constituent is recorded as line 102. This procedure continues to record lines 103 and 104 which are representative of third and fourth constituents, respectively, of the sample fluid. During the second cycle of the analysis, cam 60b serves to admit fluid from conduit 10b into the analyzer by energizing solenoid 24b'. At the same time, a signal is applied to the recorder through resistor 92 which has a value substantially less than the value of resistor 91 so that a voltage of greater amplitude is applied to the recorder. This results in a bar 105 being recorded. In a similar fashion, resistors 93 and 94 result in the subsequent recording of bars 106 and 107. The lengths of these bars on the recorder chart thus provide a visual indication of the particular sample stream that is being analyzed.

It should be evident that the 71 and 76 switches control the particular sample streams which are directed to the analyzer when the switches 61 are operated by the cams 60. These switches permit the sample cycle to be varied in any manner desired. For example, if all of the switches 76 are placed on the contacts 77, the process stream in conduit 10a is directed to the analyzer at all times. This selective switching feature is particularly valuable in many chemical operations because it is often necessary to shut down individual units for one reason or another. As such times, the analyzer can be set so that this particular unit is not sampled and the time that normally would be devoted to sampling this unit can be employed to sample other units.

While the invention has been described in conjunction with a present preferred embodiment, it should be evident that it is not limited thereto.

What is claimed is:

1. A system for analyzing a plurality of samples in sequence comprising an analyzer, a recorder, means to apply the output signal of said analyzer to said recorder, a plurality of conduits to supply said samples, a control valve in each of said conduits, an actuating means operatively connected with each of said control valves to open same, timing means, a plurality of switching means to connect said actuating means selectively to said timing means so that said valves can be opened in a preselected sequence by said timing means, and means responsive to said timing means to apply second signals of various preselected magnitudes to said recorder, said second signals of various preselected magnitudes each being indicative of the source of a respective sample directed to said analyzer.

2. A system for analyzing a plurality of samples in sequence comprising an analyzer, a recorder, means to apply the output signal of said analyzer to said recorder, a plurality of means to supply samples to be analyzed to said analyzer, control means operatively connected with each of said plurality of means to supply to control the passage of samples to said analyzer, actuating means operatively connected with each of said control means to actuate the respective control means, timing means to energize said actuating means in sequence, and means responsive to said timing means to apply to said recorder second signals of various preselected magnitudes each being indicative of the one of said plurality of means to supply which is the source of a respective sample directed to said analyzer.

3. A system for analyzing a plurality of samples in sequence comprising an analyzer adapted to provide an electrical output signal; a recorder; means to apply the output signal of said analyzer to said recorder; means to direct a plurality of samples to be analyzed to said analyzer in sequence; a plurality of sources of electrical signals of different magnitudes; and means responsive to said means to direct to apply a signal from one of said sources to said recorder each time one of the samples is directed to said analyzer, the signal applied being indicative of the source of the sample directed to the analyzer, for a time interval prior to the timer the analyzer provides the output signal representative of the sample directed thereto, said means to direct comprising a plurality of conduits to supply said samples, a control valve in each of said conduits, an actuating means operatively connected with each of said control valves to open same, and timing means to energize said actuating means in sequence.

4. The system of claim 3 further comprising a plurality of switching means to connect said actuating means selectively to said timing means so that said valves can be opened in a preselected sequence by said timing means.

5. A system for analyzing a plurality of samples in sequence comprising an analzer adapted to provide an electrical output signal; a recorder including a chart, a marking means, and a motor to drive said chart relative to said marking means; a plurality of conduits to supply samples to be analyzed to said analyzer; a control valve in each of said conduits, an actuating means operatively connected with each of said control valves to open same; timing means to energize said actuating means in sequence; means to apply the output signal of said analyzer to said marking means and to energize said motor so that the output signals of said analyzer representing each sample appear at different locations on said chart; a plurality of sources of electrical signals of different magnitudes; means responsive to said timing means to apply a signal from one of said sources to said recorder each time one of the samples is directed to said analyzer, the signal applied being indicative of the source of the sample directed to the analyzer, for a time interval prior to the time the analyzer provides the output signal representative of the sample directed thereto; and means responsive to said timing means to energize said motor during said time interval.

6. A system for analyzing a plurality of samples in sequence comprising a chromatographic analyzer adapted to provide an electrical output signal; a recorder including a chart, a marking means, and a motor to drive said chart relative to said marking means; a plurality of conduits to supply samples to said analyzer; a control valve in each of said conduits; an actuating means operatively connected with each of said control valves to open same; timing means to energize said actuating means in sequence; means to apply the output signal of said analyzer to said marking means; means responsive to said timing means to energize said motor for a predetermined time interval after each sample is directed to said analyzer; a plurality of sources of electrical signals of different magnitudes; means responsive to said timing means to apply a signal from one of said sources to said recorder each time one of the samples is directed to said analyzer, the signal applied being indicative of the source of the sample directed to the analyzer, for a time interval prior to the time the analyzer provides the output signal representative of the sample directed thereto; and means responsive to said timing means to energize said motor during said time interval.

7. A method for analyzing a plurality of samples in sequence which comprises providing a plurality of samples to be analyzed, producing a control signal, directing said plurality of samples to an analyzing zone in sequence responsive to said control signal, analyzing each of said plurality of samples in said analyzing zone, providing a plurality of identification signals having different preselected magnitudes, each of said plurality of identification signals being indicative of a source of respective one of said plurality of samples, recording the respective one of said plurality of identification signals each time a sample from the source corresponding to said respective one of said plurality of identification signals is directed to said analyzing zone, producing an output signal representative of the analysis of said sample from the source corresponding to said respective one of said plurality of identification signals, and then recording said output signal.

References Cited in the file of this patent

UNITED STATES PATENTS

| | | |
|---|---|---|
| 1,782,525 | Allen | Nov. 25, 1930 |
| 2,660,165 | Miller | Nov. 24, 1953 |
| 2,721,578 | Pouppirt | Oct. 25, 1955 |
| 2,757,541 | Watson et al. | Aug. 7, 1956 |
| 2,899,258 | Spracklen | Aug. 11, 1959 |
| 2,904,384 | Norem | Sept. 15, 1959 |
| 2,951,361 | Fuller | Sept. 6, 1960 |
| 2,995,410 | McDonnell et al. | Aug. 8, 1961 |

FOREIGN PATENTS

| | | |
|---|---|---|
| 626,787 | Great Britain | July 21, 1949 |